United States Patent
Lin

(10) Patent No.: US 9,807,816 B2
(45) Date of Patent: Oct. 31, 2017

(54) METHOD AND DEVICE FOR PERFORMING CONTROL IN WIFI NETWORK

(71) Applicant: Montage Technology (Shanghai) Co., Ltd., Shangahi (CN)

(72) Inventor: I-Yuan Lin, Taipei (TW)

(73) Assignee: MONTAGE TECHNOLOGY (SHANGHAI) CO., LTD., Shanghai (CN)

( * ) Notice: Subject to any disclaimer, the term of this patent is extended or adjusted under 35 U.S.C. 154(b) by 73 days.

(21) Appl. No.: 14/852,637

(22) Filed: Sep. 14, 2015

(65) Prior Publication Data
US 2017/0055315 A1 Feb. 23, 2017

(30) Foreign Application Priority Data
Aug. 17, 2015 (CN) .......................... 2015 1 0504750

(51) Int. Cl.
*H04W 84/12* (2009.01)
*H04W 48/08* (2009.01)

(52) U.S. Cl.
CPC .......... *H04W 84/12* (2013.01); *H04W 48/08* (2013.01)

(58) Field of Classification Search
CPC ....... H04W 4/008; H04W 8/18; H04W 12/00; H04W 12/04; H04W 12/06; H04W 12/08; H04W 84/12; H04W 48/08; H04L 63/18; H04B 5/0031
See application file for complete search history.

(56) References Cited

U.S. PATENT DOCUMENTS

| 8,526,929 | B1* | 9/2013 | Gilbert | H04M 3/38 455/409 |
| 8,665,744 | B2 | 3/2014 | Viswanathan et al. | |
| 9,009,805 | B1* | 4/2015 | Kirkby | G06K 9/00711 709/203 |
| 9,078,137 | B1* | 7/2015 | Chechani | H04W 12/08 |

(Continued)

FOREIGN PATENT DOCUMENTS

| CN | 103945369 A | 7/2014 |
| CN | 103957580 A | 7/2014 |

(Continued)

*Primary Examiner* — Tri H Phan
(74) *Attorney, Agent, or Firm* — Oliff PLC

(57) ABSTRACT

A method comprises a control device encodes a control command in a first management packet, wherein the encoding of the control command the first management packet is identifier by a predetermined identifier; transmits the encoded first management packet to a plurality of target devices. A target device determines whether a first management packet received from a control device includes a predetermined identifier; decodes the first management packet based on a predetermined decoding scheme if the first management packet received from the control device includes the predetermined identifier to obtain a control command; encodes a response to the control command in a second management packet; and transmits the encoded second management packet to the control device. The control device decodes the second management packets received from at least one of the plurality of target device, wherein the second management packets include dedicatedly encoded response in response to the control command.

26 Claims, 14 Drawing Sheets

(56) References Cited

U.S. PATENT DOCUMENTS

| | | | | |
|---|---|---|---|---|
| 9,137,808 | B2* | 9/2015 | Pearson | H04M 1/725 |
| 2009/0037207 | A1* | 2/2009 | Farah | G06Q 10/103 |
| | | | | 705/301 |
| 2013/0272164 | A1 | 10/2013 | Leonardos et al. | |
| 2014/0087748 | A1* | 3/2014 | Hong | H04W 72/1215 |
| | | | | 455/452.1 |
| 2014/0160937 | A1* | 6/2014 | Richards | H04W 12/06 |
| | | | | 370/236 |
| 2014/0204746 | A1* | 7/2014 | Sun | H04W 28/0247 |
| | | | | 370/235 |
| 2015/0004934 | A1* | 1/2015 | Qian | H04W 8/22 |
| | | | | 455/411 |
| 2015/0215297 | A1* | 7/2015 | Rathod | H04L 63/062 |
| | | | | 726/7 |
| 2016/0134691 | A1* | 5/2016 | Law | H04L 67/104 |
| | | | | 370/338 |
| 2016/0330077 | A1* | 11/2016 | Jin | H04L 41/0806 |

FOREIGN PATENT DOCUMENTS

| | | |
|---|---|---|
| WO | 2009058494 A1 | 5/2009 |
| WO | 2013156860 A1 | 10/2013 |
| WO | 2014026438 A1 | 2/2014 |

\* cited by examiner

METHOD AND DEVICE FOR PERFORMING CONTROL IN WIFI NETWORK

CROSS REFERENCE TO RELATED APPLICATION

This application claims priority to Chinese application No. 201510504750.7 entitled "method and device for performing control in WiFi network," filed on Aug. 17, 2015 by Montage Technology (Shanghai) Co., Ltd., which is incorporated herein by reference.

TECHNICAL FIELD

The present invention relates to a WiFi network, and more particularly, but not limited to a method and device for performing control in WiFi network.

BACKGROUND

According to conventional 802.11 WiFi protocol, if a target station (STA), such as a target device, for example, a webcam wants to join a specific network, a Service Set IDentifier (SSID) and pass-phrase information (i.e., WiFi provisioning information) must be provided to the target device. However, the information cannot be sent using WiFi data packets, because a STA in the infrastructure Basic Service Set (BSS) can only send data packets to its associated Access Point (AP). Therefore, it is desirable to devise a mechanism to convey these WiFi provisioning information.

SUMMARY

An embodiment of the invention discloses a method in a WiFi capable control device, comprising encoding a control command in a first management packet, wherein the encoding of the control command is identified by a predetermined identifier; transmitting the encoded first management packet to a plurality of target devices; and decoding second management packets received from at least one of the plurality of target devices, wherein the second management packets include dedicatedly encoded response in response to the control command.

An embodiment of the invention discloses a method in a target device in a WiFi network, comprising determining whether a first management packet received from a control device includes a predetermined identifier; decoding the first management packet based on a predetermined decoding scheme if the first management packet received from the control device includes the predetermined identifier to obtain a control command; encoding a response to the control command in a second management packet; and transmitting the encoded second management packet to the control device.

An embodiment of the invention discloses a WiFi capable control device, comprising a first encoder configured to encode a control command in a first management packet, wherein the encoding of the control command is identified by a predetermined identifier; a first transmitter configured to transmit the encoded first management packet to a plurality of target devices; and a first decoder configured to decode second management packets received from at least one of the plurality of target devices, wherein the second management packets include dedicatedly encoded response in response to the control command.

An embodiment of the invention discloses a target device in a WiFi network, comprising a decision unit, configured to determining whether a first management packet received from a control device includes a predetermined identifier; a second decoder configured to decode the first management packet based on a predetermined decoding scheme if the first management packet received from the control device includes the predetermined identifier to obtain a control command; a second encoder configured to encode a response to the control command in a second management packet; and a second transmitter configured to transmit the encoded second management packet to the control device.

An embodiment of the invention discloses a system comprising a control device and a target device, wherein the control device comprises a first encoder, a first transmitter, a first decoder, and the target device comprises a decision unit, a second decoder, a second encoder, and a second transmitter, wherein the first encoder is configured to encode a control command in a first management packet, wherein the encoding of the control command is identified by a predetermined identifier; the first transmitter is configured to transmit the encoded first management packet to a plurality of target devices; the decision unit is configured to determining whether a first management packet received from a control device includes a predetermined identifier; the second decoder is configured to decode the first management packet based on a predetermined decoding scheme if the first management packet received from the control device includes the predetermined identifier to obtain a control command; the second encoder is configured to encode a response to the control command in a second management packet; the second transmitter is configured to transmit the encoded second management packet to the control device; and the first decoder is configured to decode second management packets received from at least one of the plurality of target devices, wherein the second management packets include dedicatedly encoded response in response to the control command.

DESCRIPTION OF THE DRAWINGS

The present invention is illustrated in an exemplary manner by the accompanying drawings. The drawings should be understood as exemplary rather than limiting, as the scope of the invention is defined by the claims. In the drawings, the identical reference signs represent the same elements.

DETAILED DESCRIPTION

Various aspects and examples of the invention will now be described. The following description provides specific details for a thorough understanding and enabling description of these examples. Those skilled in the art will understand, however, that the invention may be practiced without many of these details. Additionally, some well-known structures or functions may not be shown or described in detail, so as to avoid unnecessarily obscuring the relevant description.

Figure 1:
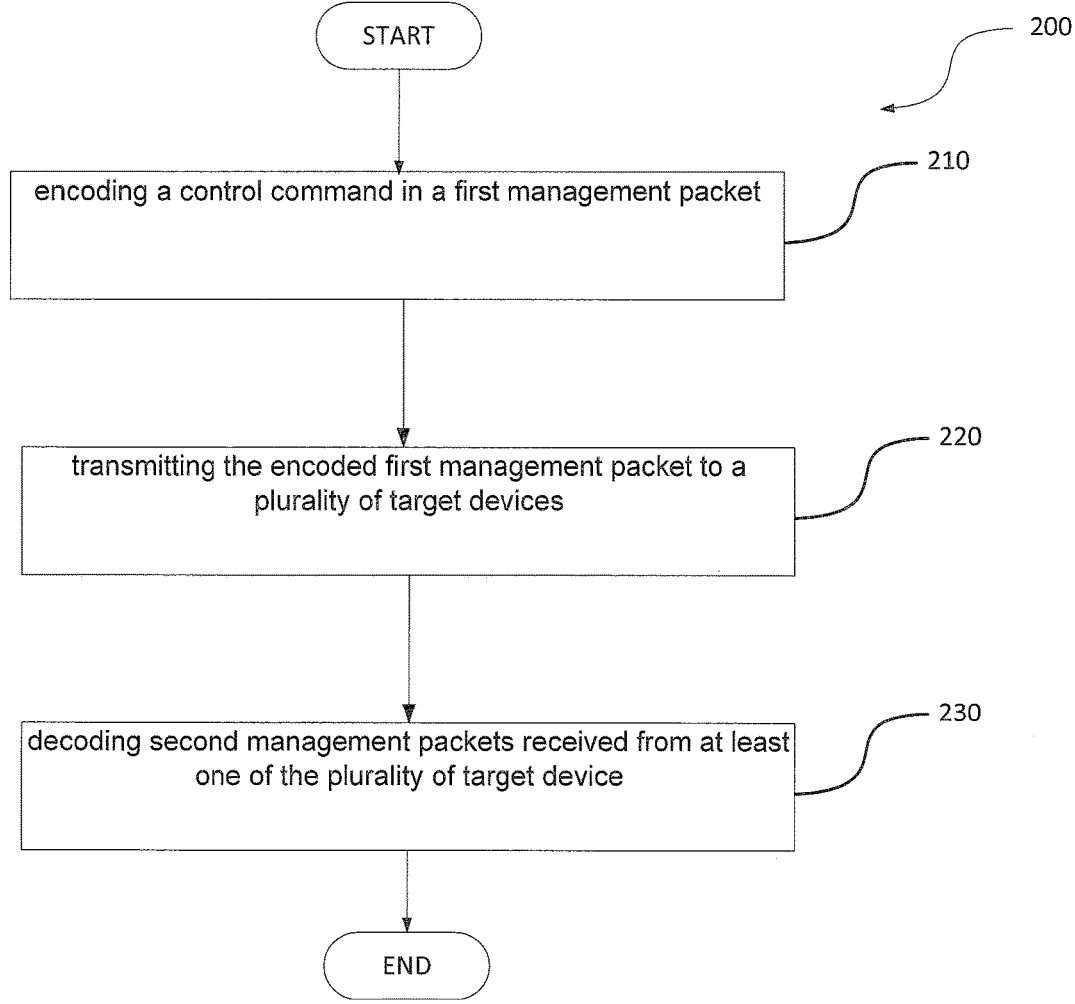
FIG. 1 is a diagram illustrating a flow chart of a method 200 in a WiFi capable control device according to an embodiment of the invention.

FIG. 1 is a diagram illustrating a flow chart of a method 200 in a control device according to an embodiment of the invention. The control device may be any device that has WiFi capabilities (or WiFi capable system), which may include personal computers, video-game consoles, smartphones, digital cameras, tablet computers and digital audio players. Target devices may include devices equipped with WiFi modules, such as personal computers, video-game consoles, smartphones, digital cameras, tablet computers, digital audio players and intelligent switch, etc. Further, the target device may also include: device without man-machine interface, such as displays, keyboards, mouse, and devices without external port (such as USB, SDIO, or NFC) to read WiFi provisional data from external devices. Further, FIG. 16 shows an exemplary application scenario of the method of present invention, which will be discussed further below. The control device may represent a WiFi capable device used by users to control another WiFi capable device. The target device may represent a WiFi capable device being controlled by any control device. Further, both control device and target devices may include WiFi capable embedded system.

The method 200 shown in FIG. 1 comprises encoding, in block 210, a control command in a first management packet, wherein the encoding of the control command is identified by a predetermined identifier; transmitting, in block 220, the encoded first management packet to a plurality of target devices; and decoding, in block 230, second management packets received from at least one of the plurality of target devices, wherein the second management packets include dedicatedly encoded response in response to the control command.

Alternatively, in block 210, encoding the control command in the first management packet further includes redefine the usage of some field in the first management packet. The dedicatedly encoded response may represent a private, proprietary or customized response which is in response to the control command sent by the control device.

Figure 5:
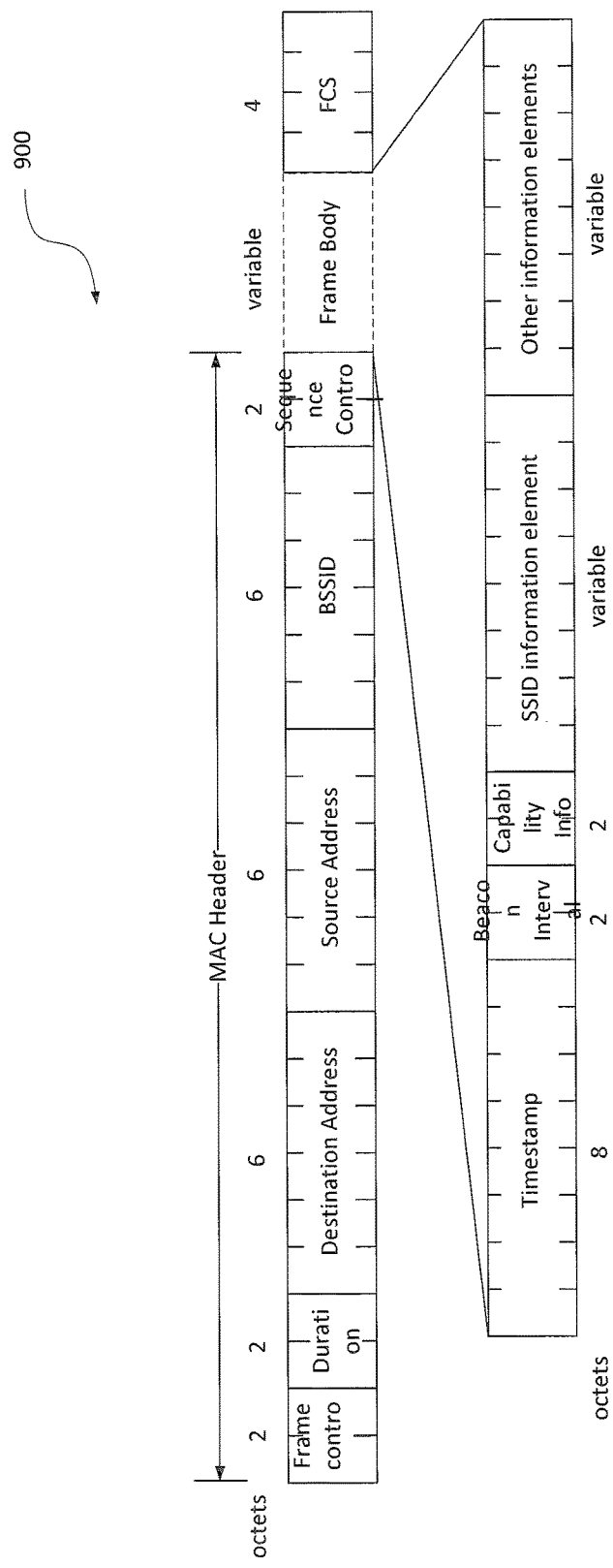
FIG. 5 is a diagram illustrating a probe response packet 900 according to an embodiment of the invention.

Further, in block 230, the encoded response packet sent from a target device will have the MAC address of the target device filled in "Source Address" field of the packet, which is shown in FIG. 5. Thus, "Source Address" is used to identify a target device. A response according to embodiment of the invention will have special encoding in the SSID information element of the second management packet (for example, probe response). The control device will determine whether the sequence number encoded and stored in BSSID field that received from the target device matches the sequence number in the SSID IE received from the target device. In other words, the control device checks SSID IE and BSSID field in the second management packet to differentiate target device according to embodiments of the invention from other conventional devices, and determine whether the second management packet is a response to the first management packet in block 210.

Alternatively, decoding the second management packets received from the at least one of the plurality of the target device occurs before the at least one of the plurality of the target devices successfully associate with a WIFI network where the control device is connected.

The following Table 1 shows a valid type and subtype combinations in 802.11 MAC header. The Type field is 2 bits in length, and the Subtype field is 4 bits in length. The Type and Subtype fields together identify the function of the frame. There are three frame types: control, data, and management. Each of the frame types has several defined subtypes. (The numeric values in Table 1 are shown in binary.)

TABLE 1

| Type value b3 b2 | Type description | Subtype value b7 b6 b5 b4 | Subtype description |
| --- | --- | --- | --- |
| 00 | Management | 0000 | Association request |
| 00 | Management | 0001 | Association response |
| 00 | Management | 0010 | Reassociation request |
| 00 | Management | 0011 | Reassociation response |
| 00 | Management | 0100 | Probe request |
| 00 | Management | 0101 | Probe response |
| 00 | Management | 0110 | Timing Advertisement |

As shown in Table 1, the Association request and Association response comprises a pair, Reassociation request and reassociation response comprises a pair and probe request and probe response comprise a pair. These pairs can be redefined according to embodiments of the invention, which will be discussed in details below.

Alternatively, the first management packet comprises a probe request packet, wherein encoding, in block 210, the control command in the first management packet comprises encoding the control command in the probe request packet, and transmitting, in block 220, the encoded first management packet comprises transmitting the encoded probe request packet. Further, decoding, in block 230, second management packets received from at least one of the plurality of target devices further comprises decoding a probe response packet received from the at least one of the plurality of target devices.

Alternatively, instead that the target device uses probe response only to respond probe request sent by the control device, the target device may use unmatched, for example, reassociation response in response of probe request sent by the control device.

Alternatively, embodiments of the invention may ban unmatched request and response. In other words, if the control device transmits a probe request, and receives an association response, the control device will consider it as an irrelevant association response which will be ignored.

Figure 2:
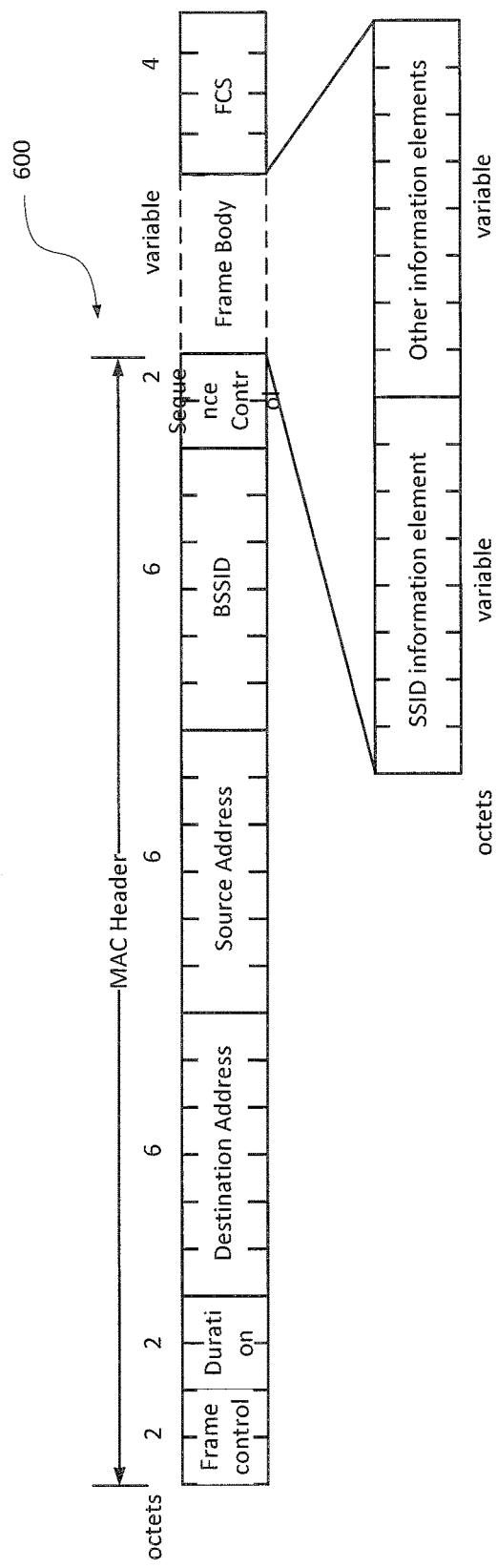
FIG. 2 is a drawing illustrating a MAC frame format 600 according to another embodiment of the invention.

FIG. 2 is a drawing illustrating a MAC frame format 600 according to another embodiment of the invention. FIG. 2 shows Destination Address and Source Address. FIG. 2 further shows BSSID field. The length of Frame Body in FIG. 2 is variable. As shown in FIG. 2, the Frame Body further comprises SSID information element (IE) and other information elements. The length of both SSID information element and other information element are variable. Further, BSSID refers to basic service set identifier; the 48 bits/6 octets identifier/address of the WiFi network. SSID refers to service set identifier (i.e. the name of the WiFi network).

Referring to FIG. 2, the probe request packet comprises a service set identifier (SSID) field, wherein encoding, in block 210, the control command in the probe request packet further comprises encoding the control command in the SSID field.

Figure 3:
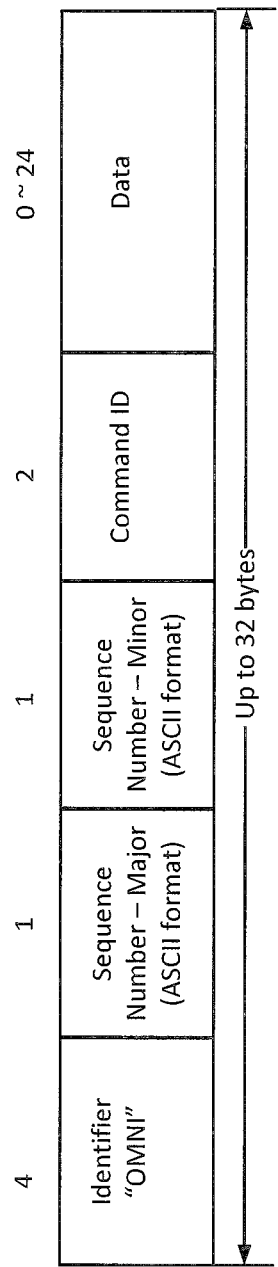
FIG. 3 is an encoding frame format of SSID in probe request packets according to an embodiment of the invention.

FIG. 3 is an encoding frame format of SSID in probe request packets according to an embodiment of the invention. In FIG. 3, for example, Identifier is used to identify encoding method of the control command, and "OMNI" in the identifier field means method of embodiments of the invention is used. The sequence number is used to check if the probe request is delivered successfully. The control device can resend the request if the probe response is not received or the received probe response packet has an unmatched sequence number. The Command ID is used to indicate the control command. The field "Data" is used to further indicate the control command. In other words, data in the data field (or command data), is the supplementary information to the command. For example, if the control device issues a "device scan" command, the data (or command data) may be used to specify which kind of device to response the command. As another example, the command data may be WiFi provisioning information if the command is "set WIFI provisioning information".

Further, the sequence number may be divided into Major and Minor sequence number. The division of major and minor sequence number may allow the control device to send multiple probe request packets and the target device to reply with multiple probe response packets. Further, multiple probe request and probe response packets with same major number will be accumulated and handled as a transaction. Further, it will help extending the maximum length of the data and the returned data representing the execution result of the command, for example, by sending multiple probe request or response packet in a transaction. (sending multiple packets with same major number and different minor numbers). The usage of major and minor sequence number will be further discussed with respect to FIGS. 11-14 below.

Alternatively, the probe request packet comprises other information elements other than a service set identifier (SSID) field, wherein encoding, in block 210, the control command in the probe request packet further comprises encoding the control command in other information elements.

Alternatively, referring back to Table 1, the first management packet comprises an association request packet. In block 210, encoding the control command in the first management packet comprises encoding the control command in the association request packet, and transmitting, in block 220, the encoded first management packet comprises transmitting the encoded association request packet. Further, decoding, in block 230, second management packets received from at least one of the plurality of target devices further comprises decoding an association response packet received from the at least one of the plurality of target devices.

Alternatively, the first management packet comprises a reassociation request packet. Referring back to FIG. 1, encoding, in block 210, the control command in the first management packet comprises encoding the control command in the reassociation request packet. Transmitting, in block 220, the encoded first management packet comprises transmitting the encoded reassociation request packet. Further, decoding, in block 230, second management packets received from at least one of the plurality of target devices further comprises decoding a reassociation response packet received from the at least one of the plurality of target devices.

Alternatively, the control command comprises a device scan command, a set WIFI provisioning information command, an apply WiFi information command, and query WiFi status command.

Figure 4:
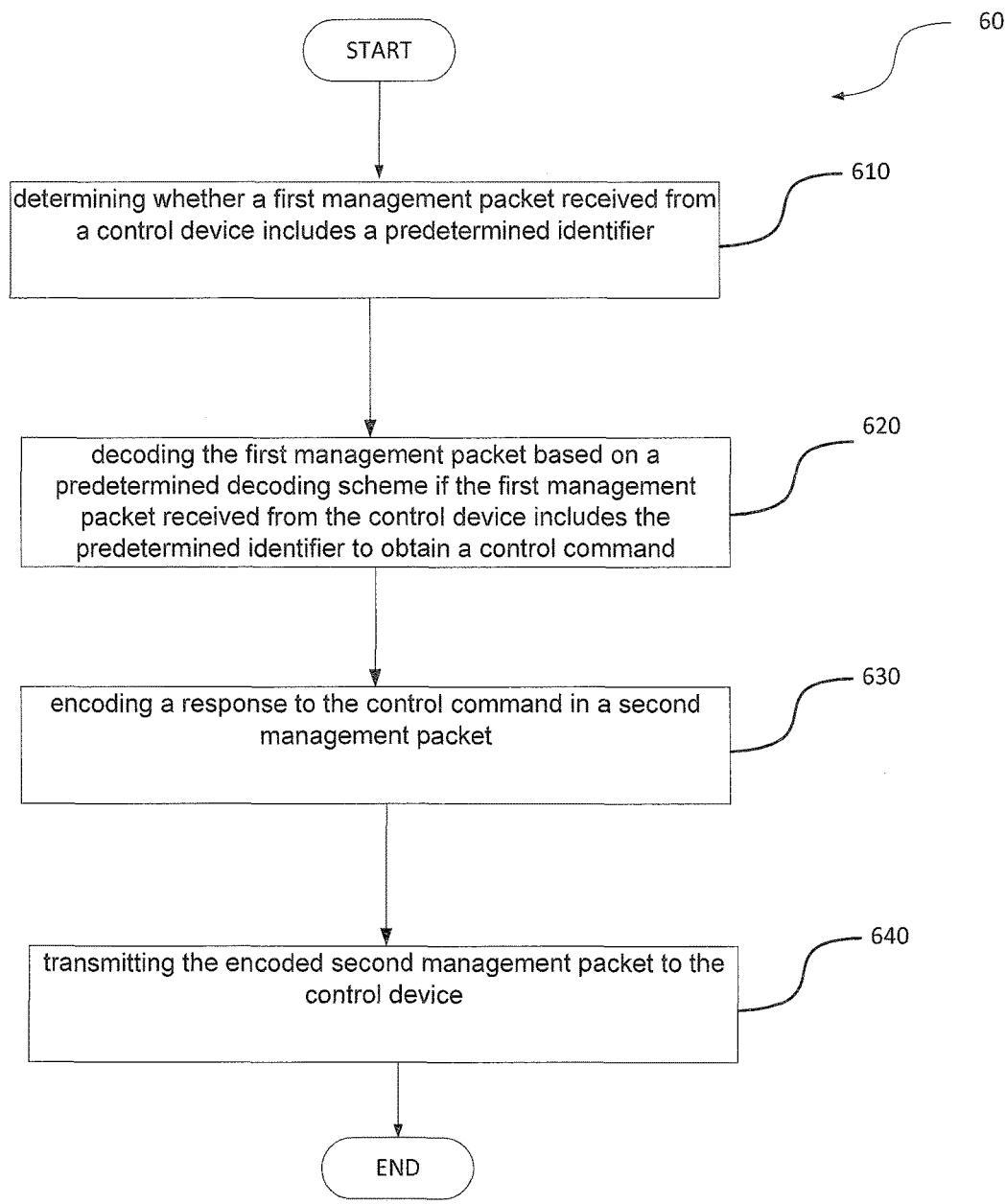
FIG. 4 is a diagram illustrating a flow chart of a method 60 in a target device in a WiFi network according to an embodiment of the invention.

FIG. 4 is a diagram illustrating a flow chart of a method 60 in a target device in a WiFi network according to an embodiment of the invention. The method 60 comprises determining, in block 610, whether a first management packet received from a control device includes a predetermined identifier; decoding, in block 620, the first management packet based on a predetermined decoding scheme if the first management packet received from the control device includes the predetermined identifier to obtain a control command. The target device may execute the control command, get the result, before proceeding to block 630. Then the method further comprises encoding, in block 630, a response to the control command in a second management packet; and transmitting, in block 640, the encoded second management packet to the control device.

The predetermined identifier may be an "OMNI" identifier. If the target device detects that the first management packet includes the "OMNI" identifier, the target device will further decode the first management packet based on the predetermined decoding scheme. The predetermined decoding scheme may comprise some hashing functions to confirm the integrity of the encoded data. In addition to the predetermined identifier, the decoding scheme may also serve as an indicator for the use of the method of embodiments of the invention, because if the contents can be correctly decoded using the predetermined decoding scheme, then it means that the received first management packet is encoded and redefined according to embodiments of the invention.

Alternatively, transmitting, in block 640, the encoded second management packet to the control device occurs before the target devices successfully associate with a WIFI network where the control device is connected.

Alternatively, when the target device decodes the first management packet and finds, according to the subtype in the MAC header (which is 0100) that the first management packet includes a probe request packet, encoding, in block 630, the response to the control command in the second management packet comprises encoding the response to the control command in the probe response packet, and transmitting, in block 640, the encoded second management packet comprises transmitting the encoded probe response packet. In other words, the target device use probe response packet to respond the probe request packet sent by the control device. However, the interpretation of the contents in the association response packet is redefined.

Alternatively, the target device can reply different probe request packets with different probe response packets. Also, it can selectively respond probe request packets.

Target device can convey dedicatedly encoded data in the BSSID field of probe response packets, which can be used as a return data to the command issued by the control device.

Alternatively, the probe response packet comprises a basic service set identifier (BSSID) field. Further, encoding, in block 630, the response to the control command in the probe response packet further comprises encoding the return data in the BSSID field.

Alternatively, the probe response packet comprises an information element other than the basic service set identifier (BSSID) field. Further, encoding, in block 630, the control command in the probe request packet further comprises encoding the control command in an information element.

Alternatively, when the target device decodes the first management packet and finds, according to the subtype in the MAC header (which is 0000) that the first management packet includes an association request packet, encoding, in block 630, the response to the control command in the second management packet comprises encoding the response to the control command in the association response packet, and transmitting, in block 640, the encoded second management packet comprises transmitting the encoded association response packet. In other words, the target device use association response packet to respond the association request packet sent by the control device. However, the interpretation of the contents in the association response packet is redefined.

Alternatively, when the target device decodes the first management packet and finds, according to the subtype in the MAC header (which is 0010) that the first management packet includes a reassociation request packet, encoding, in block 630, the response to the control command in the second management packet comprises encoding the response to the control command in the reassociation response packet, and transmitting, in block 640, the encoded second management packet comprises transmitting the encoded reassociation response packet. In other words, the target device use reassociation response packet to respond the reassociation request packet sent by the control device. However, the interpretation of the contents in the reassociation response packet is redefined.

Alternatively, the response to the control command comprises a response to a WIFI provisioning command, a response to a device scan command, a response to a set WiFi provisional information, a response to an apply WiFi information command, and a WiFi status command.

FIG. 5 is a diagram illustrating a probe response packet 900 according to an embodiment of the invention. FIG. 5 shows a Destination Address and a Source Address. FIG. 5 further shows BSSID field. The length of Frame Body in FIG. 5 is variable. As shown in FIG. 5, the Frame Body further comprises Timestamp, Beacon Interval, Capability Info, SSID information element (IE) and other information elements. The length of both SSID information element and other information element are variable. The target device replies the Probe request packet with Probe response packet. The dedicatedly encoded response data may be stored in the BSSID field of the probe response packet. Alternatively, it can be stored as an "information element" in a probe response packet.

Figure 6:
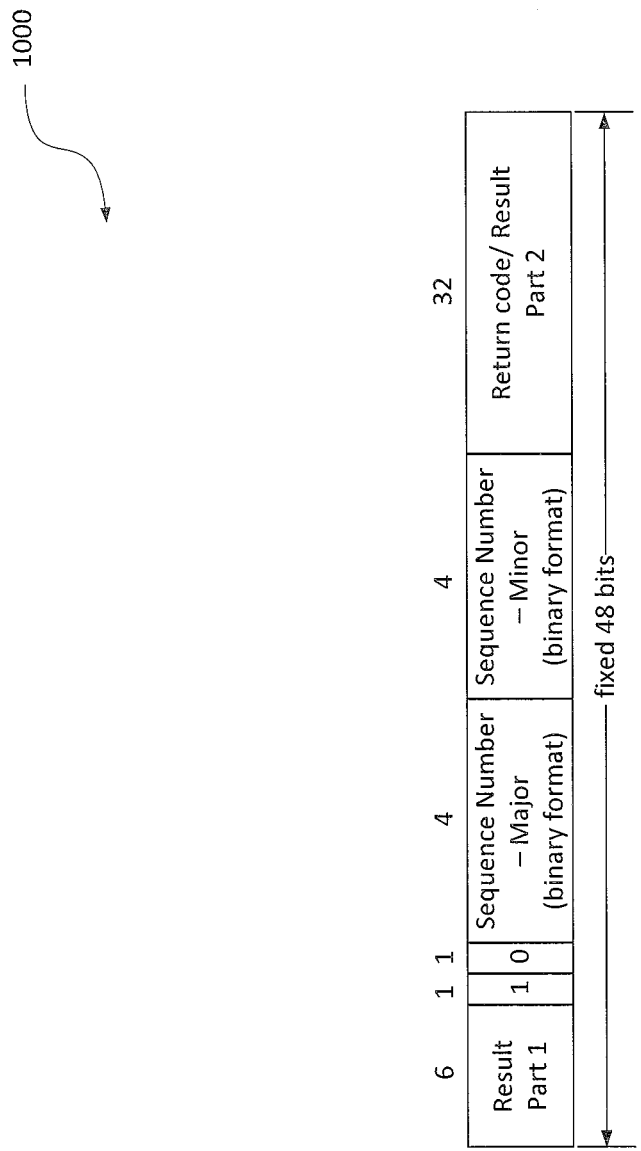
FIG. 6 is a diagram illustrating an encoding frame format 10000 of BSSID in probe response packets according to an embodiment of the invention.

FIG. 6 is a diagram illustrating an encoding frame format 1000 of BSSID in probe response packets according to an embodiment of the invention. The "return code (result) part 1" and "return code (result) part 2" are used solely for returning the result of command execution. The target devices can be differentiated by "Source Address".

The BSSID field can accommodate 48 bits data. The 48 bits data is used to store the result of the command execution. The 2 bits (10) are fixed. The space to store return data is split into two parts, Result Part 1 and Result Part 2. There is no difference in the usage of these two parts.

Figure 7:
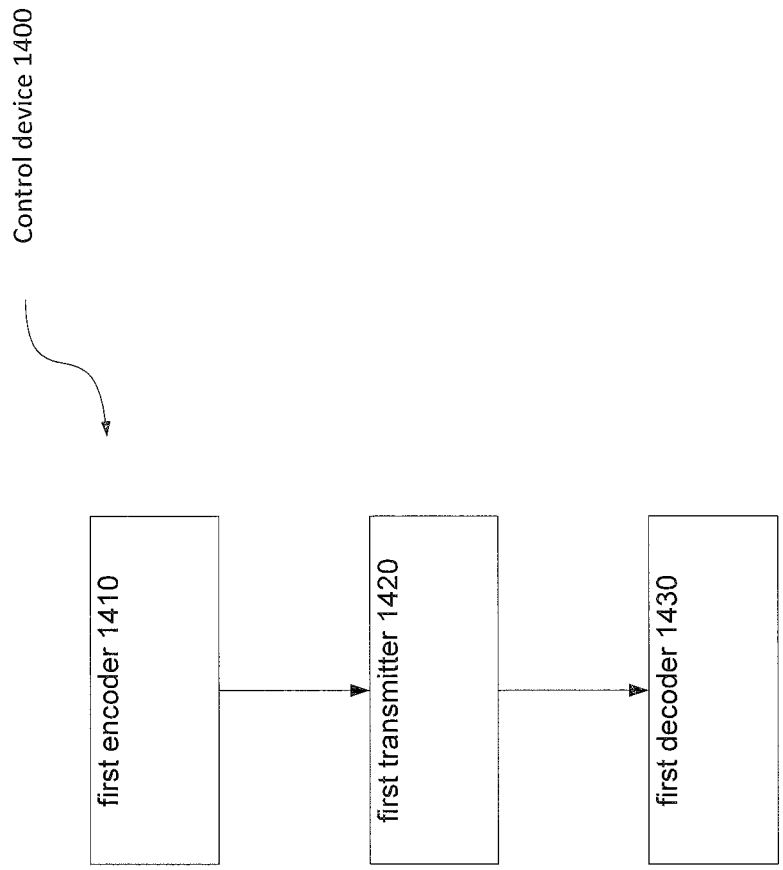
FIG. 7 is a block diagram illustrating a WiFi capable control device 1400 according to an embodiment of the invention.

FIG. 7 is a block diagram illustrating a WiFi capable control device 1400 according to an embodiment of the invention. The control device 1400 comprises a first encoder 1410, a first transmitter 1420, and a first decoder 1430. The first encoder 1410 encodes a control command in a first management packet, wherein the encoding of the control command is identified by a predetermined identifier. The first transmitter 1420 transmits the encoded first management packet to a plurality of target devices. The first decoder 1430 decodes second management packets received from at least one of the plurality of target devices, wherein the second management packets include dedicatedly encoded response in response to the control command.

Note the control device 1400 may reside in memory or storage. Alternatively, the control device 1400 introduced above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Alternatively, decoding the second management packets received from the at least one of the plurality of the target device occurs before the at least one of the plurality of the target devices successfully associate with a WIFI network where the control device is connected.

Alternatively, the first management packet comprises a probe request packet, wherein the first encoder 1410 further encodes the control command in the probe request packet, and the first transmitter 1420 further transmits the encoded first management packet comprises transmitting the encoded probe request packet.

Alternatively, the probe request packet comprises a service set identifier (SSID) information element, wherein the first encoder 1410 further encodes the control command in the SSID information element.

Alternatively, the probe request packet comprises other information elements other than a service set identifier (SSID) information element, wherein the first encoder 1410 further encodes the control command in the probe request packet further comprises encoding the control command in the other information elements.

Figure 8:
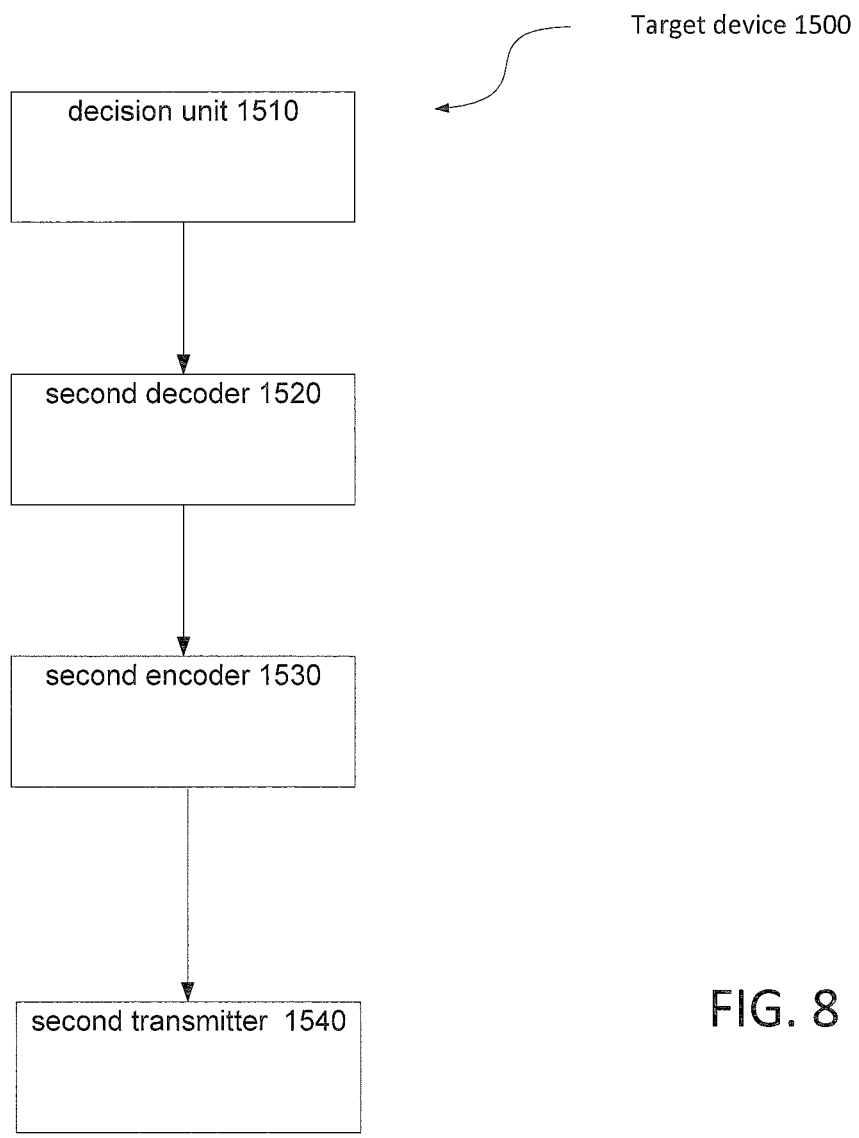
FIG. 8 is a block diagram illustrating a target device 1500 according to an embodiment of the invention.

FIG. 8 is a block diagram illustrating a target device 1500 according to an embodiment of the invention. The target device 1500 in the WiFi network comprises a decision unit 1510, a second decoder 1520, a second encoder 1530, and a second transmitter 1540.

The decision unit 1510 determines whether a first management packet received from a control device includes a predetermined identifier. The second decoder 1520 decodes the first management packet based on a predetermined decoding scheme if the first management packet received from the control device includes the predetermined identifier to obtain a control command. The second encoder 1530 encodes a response to the control command in a second management packet. The second transmitter 1540 transmits the encoded second management packet to the control device.

Note the target device 1500 may reside in memory or storage. Alternatively, the target device 1500 introduced above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Alternatively, the second transmitter 1540 transmits the encoded second management packet to the control device before the target devices successfully associate with a WIFI network where the control device is connected.

Alternatively, the second management packet comprises a probe response packet, wherein the second encoder is further configured to encode the response to the control command in the probe response packet, and the second transmitter 1540 further transmits the encoded second management packet comprises transmitting the encoded probe response packet.

Alternatively, the probe response packet comprises a basic service set identifier (BSSID) field, wherein the second encoder 1530 further encodes the control command in the BSSID field.

Alternatively, the probe response packet comprises an information element other than a basic service set identifier (BSSID) field, wherein the second encoder 1530 further encodes the control command in the information element.

Figure 9:
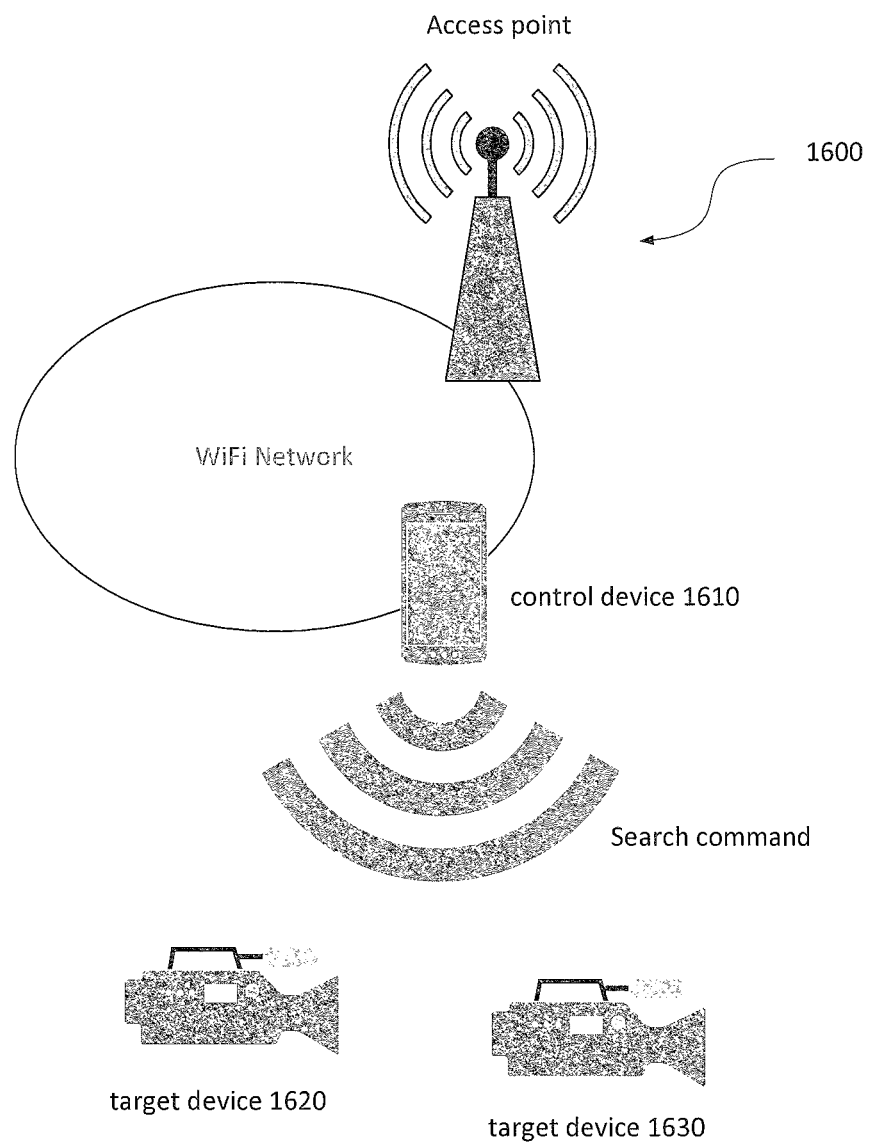
FIG. 9 is a diagram illustrating an exemplary application scenario 1600 of the embodiments of present invention.
Figure 10:
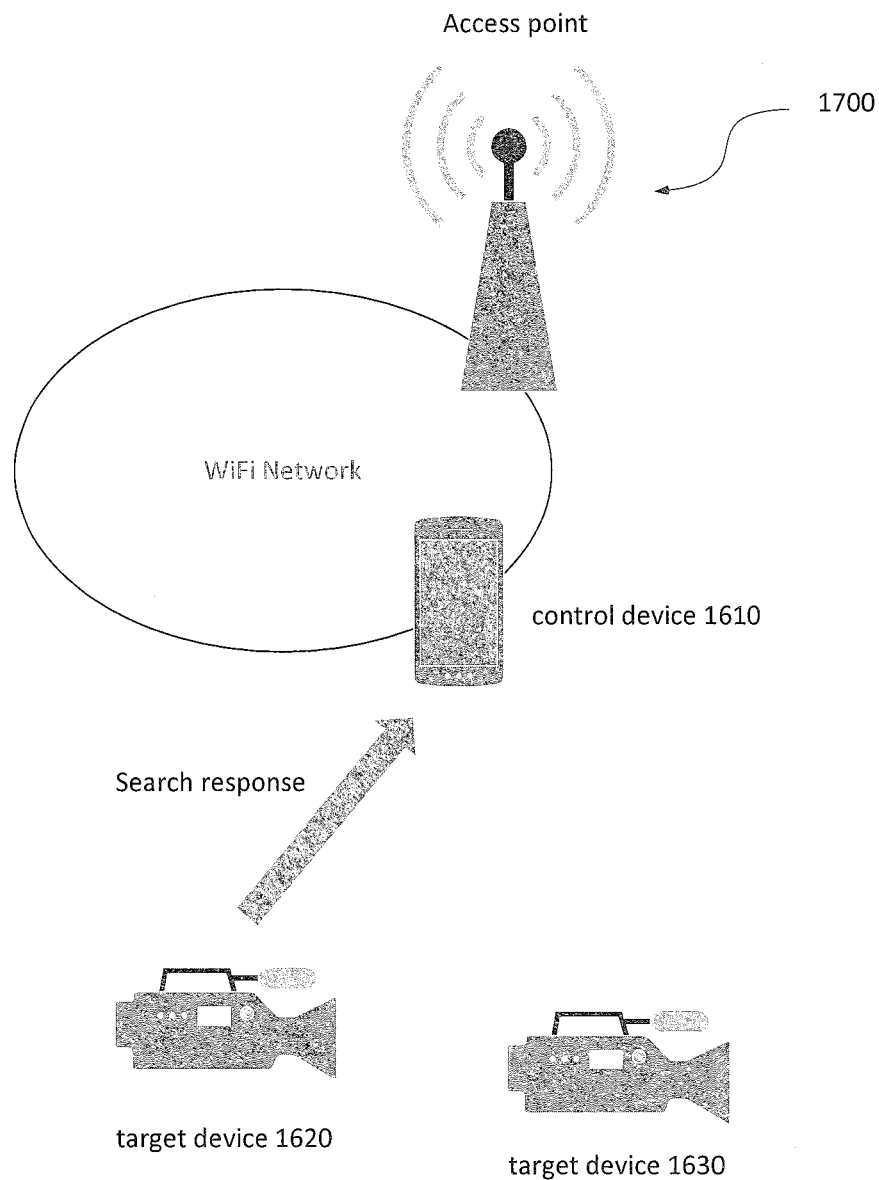
FIG. 10 is a diagram illustrating an exemplary application scenario 1700 of the embodiments of present invention.

FIGS. 9 and 10 are diagrams illustrating exemplary application scenarios 1600 and 1700 of the embodiments of present invention. FIGS. 9 and 10 describe a typical application/use-scenario which adopts embodiments of the invention. In the following use-scenario, control device (such as an Android based smart-phone) is used to deliver WiFi provisioning information to a target device (WiFi device, such as camera or Set Top Box (STB) with WiFi module) and request the target device to associate with the specific WiFi network.

The control device 1610 issues a "device scan" command by sending a probe request packet (as shown in FIG. 9). For example, The control device 1610 first encodes a "device scan" command in the management packet and sends the encoded management packet including the "device scan" command. The scan command is encoded and stored in SSID information element of a probe request packet. Some search criteria (i.e. product identity) can be specified with the search command to designate which target devices shall response this command. Target devices, such as target device 1620 between target device 1620 and target device 1630 that matches the search criteria responds (as shown in FIG. 10) a probe response packet. The response data is encoded and stored in BSSID field of probe response packets.

Further, the control device 1610 further selects at least one target device to be controlled. The control device 1610 may issue a "set WiFi-info" command to send the WiFi provisioning information to target device 1620 and 1630. For example, the MAC address of the selected target devices 1620 and 1630 are encoded (together with control command) into SSID field. Target devices 1620 and 1630 will decode the SSID field and determine whether the control command shall be accepted or not by checking the MAC address decoded. Only the specific target device will take the command and send the response. For example, target device 1620 can decode the MAC address successfully and the decoded MAC address matched target device 1620's own MAC address, while target device 1630 cannot decode the MAC address successfully, or the decoded MAC address does not match target device 1630's own MAC address. Therefore, the target device, for example, target device 1620 responds the command.

The control device 1610 repeats issues "set WiFi-info" and the target device 1620 repeats respond the commands, until all WiFi provisioning information is received by the target device successfully. The control device 1610 will re-send the command if it does not receive the valid response from any of the target devices 1620 or 1630. The control device 1610 issues a "apply WiFi-info" command to request the target device 1620 to associate with the network specified in the WiFi provisioning information. The target device 1620 responds the "apply WiFi-info" command and start to associate with the network. When the target device 1620 is associated with the WiFi network, the control device 1610 keeps issuing a "query WiFi status" command to check the status of target device 1620. The target device 1620 will always respond the "query WiFi status" command with latest WiFi provisioning status. The control device 1610 reports the final result (either success or failure) to the user once the target device 1620 completes the association operation.

Alternatively, instead of encoding the MAC address of the target devices in every SSID field sent as illustrated in the previous embodiment, the control device and the target device can be "paired-up". Once the control and the target device are "paired-up", the command sent from the control device will be always designated for the specific target device.

Figure 11:
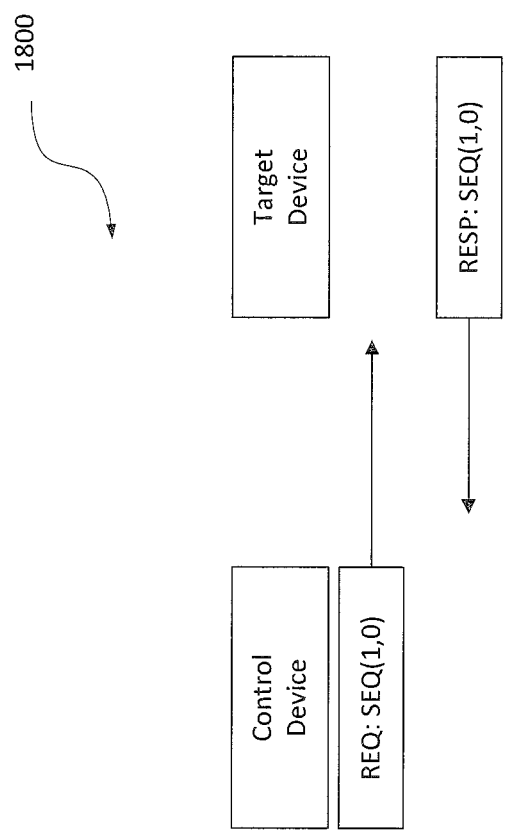
FIG. 11 is a diagram illustrating a control transaction 1800 according to an embodiment of the invention.

FIG. 11 is a diagram illustrating a control transaction 1800 according to an embodiment of the invention. FIG. 11 shows a one-one control transaction. In one-one control transaction, the control device issues one request REQ:SEQ (1,0) and gets one response RESP:SEQ (1,0) from the target device. "1" in both REQ and RESP packet represents the major field, while "0" in both REQ and RESP packet represents the minor field, as already discussed with respect to FIG. 3 and FIG. 6. The control device re-sends the request if the response is missing or the response contains unmatched sequence number. In the embodiment shown in FIG. 11, the sequence number in the response matches the sequence number in the request. Therefore the response is successfully received by the control device.

Figure 12:
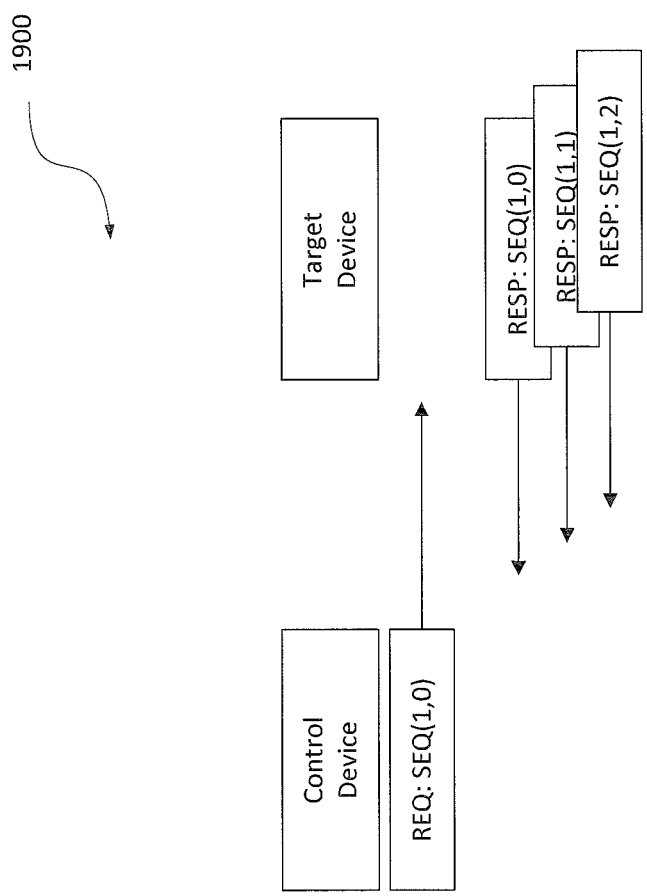
FIG. 12 is a diagram illustrating a control transaction 1900 according to another embodiment of the invention.

FIG. 12 is a diagram illustrating a control transaction 1900 according to another embodiment of the invention. FIG. 12 shows a one-multiple control transaction. In one-multiple control transaction, for example, one probe request followed by multiple probe response. This control transaction allows more response data returned in one control transaction. In FIG. 12, the control device issues one request REQ:SEQ (1,0) and gets multiple responses RESP:SEQ (1,0), RESP:SEQ (1,1) and RESP:SEQ (1,2) from the target device. The leftmost"1" in both REQ and RESP packet represent the major field, while the rightmost "0" in REQ packet and rightmost 0, 1, 2 in three respective RESP packets represent the minor field, as already discussed with respect to FIG. 3 and FIG. 6.

Figure 13:
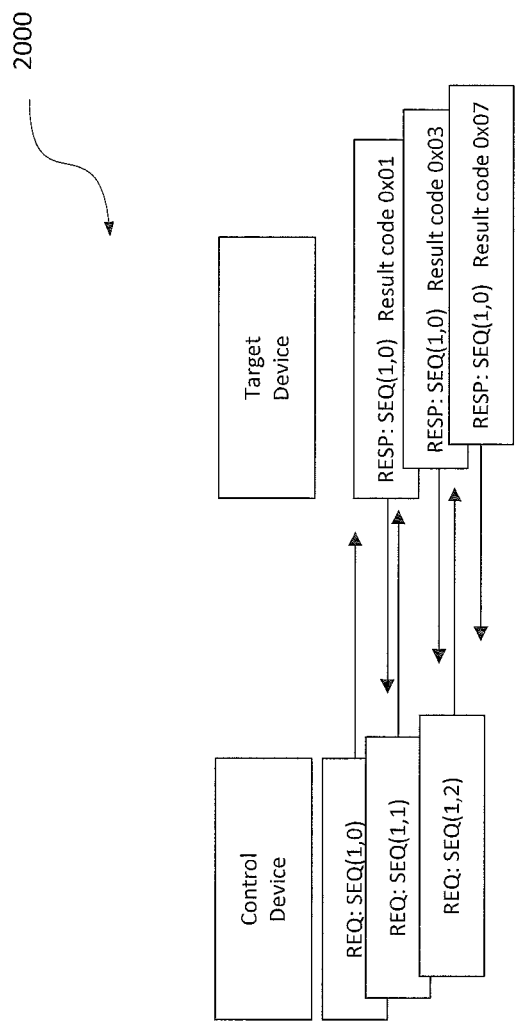
FIG. 13 is a diagram illustrating a control transaction 2000 according to another embodiment of the invention.

FIG. 13 is a diagram illustrating a control transaction 2000 according to another embodiment of the invention. FIG. 13 shows a multiple-multiple control transaction. Control device sends multiple probe requests to encapsulate complex command data. The target device can use the return code to indicate which probe request is missed. In the scenario shown in FIG. 13, the three responses respectively use return code 0x01 (or 0001 in binary representation), 0x03 (or 0011 in binary representation), 0x07 (or 0111 in binary representation), which indicate that no request is missing.

Figure 14:
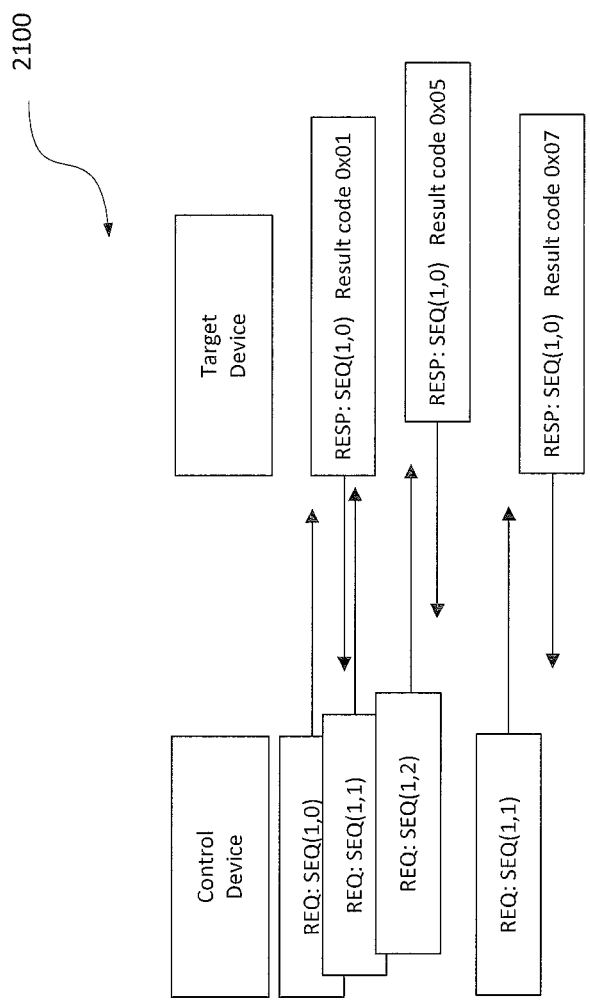
FIG. 14 is a diagram illustrating a control transaction 2100 according to another embodiment of the invention.

FIG. 14 is a diagram illustrating a control transaction 2100 according to another embodiment of the invention. FIG. 14 shows a multiple-multiple control transaction. Control device sends multiple probe requests to encapsulate complex command data. Target device can use the return code to indicate which probe request is missed. In the scenario shown in FIG. 14, the three responses respectively use return code 0x01 (or 0001 in binary representation), 0x05 (or 0101 in binary representation), 0x07 (or 0111 in binary representation), which indicate that a request is missing. For 0x05 (0x101), the "1" are not continuous, which indicates that a "1" is missing.

Further, embodiments of the invention may be applied to:

a control device can search for compatible target device(s);

a control device can send WiFi provisioning information to target device(s);

a control device can ask target devices(s) to associate with a WiFi network using the information provided in the WiFi provisioning information, and this process is called WiFi provisioning;

a control device can query the WiFi provisioning status of target device(s); and a control device may issue other control commands to target device(s) and then retrieve the result of the operation from target devices(s).

Alternatively, the dedicatedly encoded return data could be stored as an information element in the probe response packet.

The exchange of SSID IE (or other information element field) in the probe request packets and the BSSID field (or other information element field) in the probe response packets allows a bi-directional communication channel to be established.

A bi-directional communication channel established using this methodology can be used (but not limited) to configure the WiFi of a target device (a.k.a. WiFi provisioning). More control application (other than WiFi provisioning) is feasible when a bi-directional communication channel is available.

Embodiments of the invention may extend capabilities of management packets, so that some field of response packets will be changed to store private response data. This protocol change allows the control command and private response data to be conveyed from the control device to the target device, and vice versa, which forms a bi-directional data communication channel. By using this bi-directional data communication channel, a control device can control a target device thoroughly. The control device can communicate with the target device, even the target device and the control device associated with different WiFi networks. Further, conveying WiFi provisioning information is not the only application.

Features and aspects of various embodiments may be integrated into other embodiments, and embodiments illustrated in this document may be implemented without all of the features or aspects illustrated or described. One skilled in the art will appreciate that although specific examples and embodiments of the system and methods have been described for purposes of illustration, various modifications can be made without deviating from the spirit and scope of the present invention. Moreover, features of one embodiment may be incorporated into other embodiments, even where those features are not described together in a single embodiment within the present document. Accordingly, the invention is described by the appended claims.

I claim:

1. A method in a WiFi capable control device, comprising
encoding a control command in a first management packet, wherein the encoding of the control command is identified by a predetermined identifier;
transmitting the encoded first management packet to a plurality of target devices; and
decoding second management packets received from at least one of the plurality of target devices, wherein the second management packets include dedicatedly encoded response in response to the control command; wherein the first management packet and the second management packets are processed using a custom encoding that is distinct from any standard WiFi management packet format used by a WiFi device.

2. The method of claim 1, wherein decoding the second management packets received from the at least one of the plurality of the target device occurs before the at least one of the plurality of the target devices successfully associate with a WIFI network where the control device connected.

3. The method of claim 1, wherein the first management packet comprises a probe request packet, wherein
encoding the control command in the first management packet comprises encoding the control command in the probe request packet, and
transmitting the encoded first management packet comprises transmitting the encoded probe request packet.

4. The method of claim 3, wherein the probe request packet comprises a service set identifier (SSID) information element, wherein
encoding the control command in the probe request packet further comprises encoding the control command in the SSID information element.

5. The method of claim 3, wherein the probe request packet comprises other information elements other than a service set identifier (SSID) information element, wherein
encoding the control command in the probe request packet further comprises encoding the control command in the other information elements.

6. The method of claim 1, wherein the first management packet comprises an association request packet, wherein
encoding the control command in the first management packet comprises encoding the control command in the association request packet, and
transmitting the encoded first management packet comprises transmitting the encoded association request packet.

7. The method of claim 1, wherein the first management packet comprises a reassociation request packet, wherein
encoding the control command in the first management packet comprises encoding the control command in the reassociation request packet, and
transmitting the encoded first management packet comprises transmitting the encoded reassociation request packet.

8. The method of claim 1, wherein the control command comprises a device scan command, a set WIFI provisioning information command, an apply WiFi information command, or query WiFi status command.

9. A method in a target device in a WiFi network, comprising
determining whether a first management packet received from a control device includes a predetermined identifier;

decoding the first management packet based on a predetermined decoding scheme if the first management packet received from the control device includes the predetermined identifier to obtain a control command;
encoding a response to the control command in a second management packet; and
transmitting the encoded second management packet to the control device; wherein the first management packet and the second management packets are processed using a custom encoding that is distinct from any standard WiFi management packet format used by a WiFi device.

10. The method of claim 9, wherein transmitting the encoded second management packet to the control device occurs before the target devices successfully associate with a WIFI network where the control device is connected.

11. The method of claim 9, wherein the second management packet comprises a probe response packet, wherein
encoding the response to the control command in the second management packet comprises encoding the response to the control command in the probe response packet, and
transmitting the encoded second management packet comprises transmitting the encoded probe response packet.

12. The method of claim 11, wherein the probe response packet comprises a basic service set identifier (BSSID) field, wherein
encoding the response to the control command in the probe response packet further comprises encoding the control command in the BSSID field.

13. The method of claim 11, wherein the probe response packet comprises an information element other than a basic service set identifier (BSSID) field, wherein
encoding the control command in the probe request packet further comprises encoding the control command in the information element.

14. The method of claim 9, wherein the second management packet comprises an association response packet, wherein
encoding the response to the control command in the second management packet comprises encoding the response to the control command in the association response packet, and
transmitting the encoded second management packet comprises transmitting the encoded association response packet.

15. The method of claim 9, wherein the second management packet comprises a reassociation response packet, wherein
encoding the response to the control command in the second management packet comprises encoding the response to the control command in the reassociation response packet, and
transmitting the encoded second management packet comprises transmitting the encoded reassociation response packet.

16. The method of claim 9, wherein the response to the control command comprises a response to a WIFI provisioning command, a response to a device scan command, a set WIFI provisioning information command, an apply WiFi information command, or a query WiFi status command.

17. A WiFi capable control device, comprising
a first encoder configured to encode a control command in a first management packet, wherein the encoding of the control command is identified by a predetermined identifier;
a first transmitter configured to transmit the encoded first management packet to a plurality of target devices; and
a first decoder configured to decode second management packets received from at least one of the plurality of target devices, wherein the second management packets include dedicatedly encoded response in response to the control command; wherein the first management packet and the second management packets are processed using a custom encoding that is distinct from any standard WiFi management packet format used by a WiFi device.

18. The control device of claim 17, wherein the first decoder is further configured to decode the second management packets received from the at least one of the plurality of the target device before the at least one of the plurality of the target devices successfully associate with a WIFI network where the control device is connected.

19. The control device of claim 17, wherein the first management packet comprises a probe request packet, wherein
the first encoder is further configured to encode the control command in the probe request packet, and the first transmitter is further configured to transmit the encoded probe request packet.

20. The control device of claim 19, wherein the probe request packet comprises a service set identifier (SSID) information element, wherein
the first encoder is further configured to encode the control command in the SSID information element.

21. The control device of claim 19, wherein the probe request packet comprises other information elements other than a service set identifier (SSID) information element, wherein
the first encoder is further configured to encode the control command in the other information elements.

22. A target device in a WiFi network, comprising
a decision unit, configured to determining whether a first management packet received from a control device includes a predetermined identifier;
a second decoder configured to decode the first management packet based on a predetermined decoding scheme if the first management packet received from the control device includes the predetermined identifier to obtain a control command;
a second encoder configured to encode a response to the control command in a second management packet; and
a second transmitter configured to transmit the encoded second management packet to the control device; wherein the first management packet and the second management packets are processed using a custom encoding that is distinct from any standard WiFi management packet format used by a WiFi device.

23. The target device of claim 22, wherein the second transmitter is further configured to transmit the encoded second management packet to the control device before the target devices successfully associate with a WIFI network where the control device is connected.

24. The target device of claim 22, wherein the second management packet comprises a probe response packet, wherein
the second encoder is further configured to encode the response to the control command in the probe response packet, and
the second transmitter is further configured to transmit the encoded probe response packet.

25. The target device of claim 24, wherein the probe response packet comprises a basic service set identifier (BSSID) field, wherein
    the second encoder is further configured to encode the control command in the BSSID field.

26. The target device of claim 24, wherein the probe response packet comprises an information element other than a basic service set identifier (BSSID) field, wherein
    the second encoder is further configured to encode the control command in the information element.

\* \* \* \* \*